United States Patent
Liu et al.

(10) Patent No.: US 11,003,457 B2
(45) Date of Patent: May 11, 2021

(54) POWER-SAVING MECHANISM FOR MEMORY SUB-SYSTEM IN PIPELINED PROCESSOR

(71) Applicant: MEDIATEK INC., Hsin-Chu (TW)

(72) Inventors: Hsing-Chuang Liu, Hsinchu (TW); Chang-Chia Lee, Hsinchu (TW); Yu-Shu Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 84 days.

(21) Appl. No.: 16/255,165

(22) Filed: Jan. 23, 2019

(65) Prior Publication Data

US 2020/0233673 A1    Jul. 23, 2020

(51) Int. Cl.
*G06F 9/30* (2018.01)
*G06F 9/38* (2018.01)

(52) U.S. Cl.
CPC .......... *G06F 9/3869* (2013.01); *G06F 9/3802* (2013.01)

(58) Field of Classification Search
None
See application file for complete search history.

(56) References Cited

U.S. PATENT DOCUMENTS

| | | | |
|---|---|---|---|
| 5,809,326 A * | 9/1998 | Nogami | G06F 9/381 712/233 |
| 7,020,788 B2 * | 3/2006 | Catherwood | G06F 1/3203 713/322 |
| 7,676,657 B2 | 3/2010 | Lindholm et al. | |
| 8,352,712 B2 | 1/2013 | Bell, Jr. et al. | |

FOREIGN PATENT DOCUMENTS

| | | |
|---|---|---|
| TW | 200529071 A | 9/2005 |
| TW | 200612332 A | 4/2006 |

OTHER PUBLICATIONS

Chinese language office action dated Aug. 31, 2020, issued in application No. TW 108139683.

* cited by examiner

*Primary Examiner* — Cheng Yuan Tseng
(74) *Attorney, Agent, or Firm* — McClure, Qualey & Rodack, LLP

(57) ABSTRACT

A pipelined processor for carrying out pipeline processing of instructions, which undergo a plurality of stages, is provided. The pipelined processor includes: a memory-activation indicator and a memory controller. The memory-activation indicator stores content information that indicates whether to activate a first volatile memory and/or a second volatile memory while performing a current instruction. The memory controller is arranged for controlling activation of the first volatile memory and/or the second volatile memory in a specific stage of the plurality of stages of the current instruction according to the content information stored in the memory-activation indicator.

24 Claims, 4 Drawing Sheets

POWER-SAVING MECHANISM FOR MEMORY SUB-SYSTEM IN PIPELINED PROCESSOR

BACKGROUND OF THE DISCLOSURE

Field of the Disclosure

The disclosure relates to a computer system, and, in particular, to a pipelined processor and a power-saving method for a memory sub-system in the pipelined processor.

Description of the Related Art

Many processing devices utilize caches to reduce the average time required to access information stored in a memory. A cache is a smaller and faster memory that stores copies of instructions and/or data that are expected to be used relatively frequently. For example, processors such as central processing units (CPUs) graphical processing units (GPUs), accelerated processing units (APUs), and the like are generally associated with a cache or a hierarchy of cache memory elements. Instructions or data that are expected to be used by the CPU are moved from (relatively large and slow) main memory into the cache. When the CPU needs to read or write a location in the main memory, it first checks to see whether the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the average latency of memory accesses below the latency of the main memory to a value close to the value of the cache memory.

One widely used architecture for a CPU cache memory is a hierarchical cache that divides the cache into two levels known as the L1 cache and the L2 cache. The L1 cache is typically a smaller and faster memory than the L2 cache, which is smaller and faster than the main memory. The CPU first attempts to locate needed memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed near entities that require more frequent access to instructions than data, whereas the L1-D can be placed closer to entities that require more frequent access to data than instructions. The L2 cache is typically associated with both the L1-I and L1-D caches and can store copies of instructions or data that are retrieved from the main memory. Frequently used instructions are copied from the L2 cache into the L1-I cache and frequently used data can be copied from the L2 cache into the L1-D cache. With this configuration, the L2 cache is referred to as a unified cache.

BRIEF SUMMARY OF THE DISCLOSURE

A detailed description is given in the following embodiments with reference to the accompanying drawings.

A pipelined processor for carrying out pipeline processing of instructions to be input, which undergo a plurality of stages, comprising: a memory-activation indicator, storing content information that indicates whether to activate a first volatile memory and/or a second volatile memory while performing a current instruction; and a memory controller, arranged for controlling activation of the first volatile memory and/or the second volatile memory in a specific stage of the plurality of stages of the current instruction according to the content information stored in the memory-activation indicator.

A power-saving method for use in a memory sub-system in a pipelined processor is provided. The pipelined processor includes a plurality of stages, and the memory sub-system comprises a first volatile memory and a second volatile memory. The method includes the steps of: retrieving content information from a memory-activation indicator in the pipelined processor, wherein the content information indicates whether to activate the first volatile memory and/or the second volatile memory while performing a current instruction; and controlling activation of the first volatile memory and/or the second volatile memory in a specific stage of the plurality of stages of the current instruction according to the content information stored in the memory-activation indicator.

In an embodiment, the memory-activation indicator is a program counter, and the specific stage is an instruction-fetch stage, and the first volatile memory and the second volatile memory are respectively an instruction cache and an instruction memory in the pipelined processor that store a plurality of instructions.

In another embodiment, the memory-activation indicator is a register file in the pipelined processor, and the specific stage is an execution stage, and the first volatile memory and the second volatile memory are respectively a data cache and a data memory in the pipelined processor that store data.

In yet another embodiment, the memory-activation indicator is a register file in the pipelined processor, and the specific stage is an execution stage, and the first volatile memory and the second volatile memory are respectively an internal memory and an external memory of the pipelined processor.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
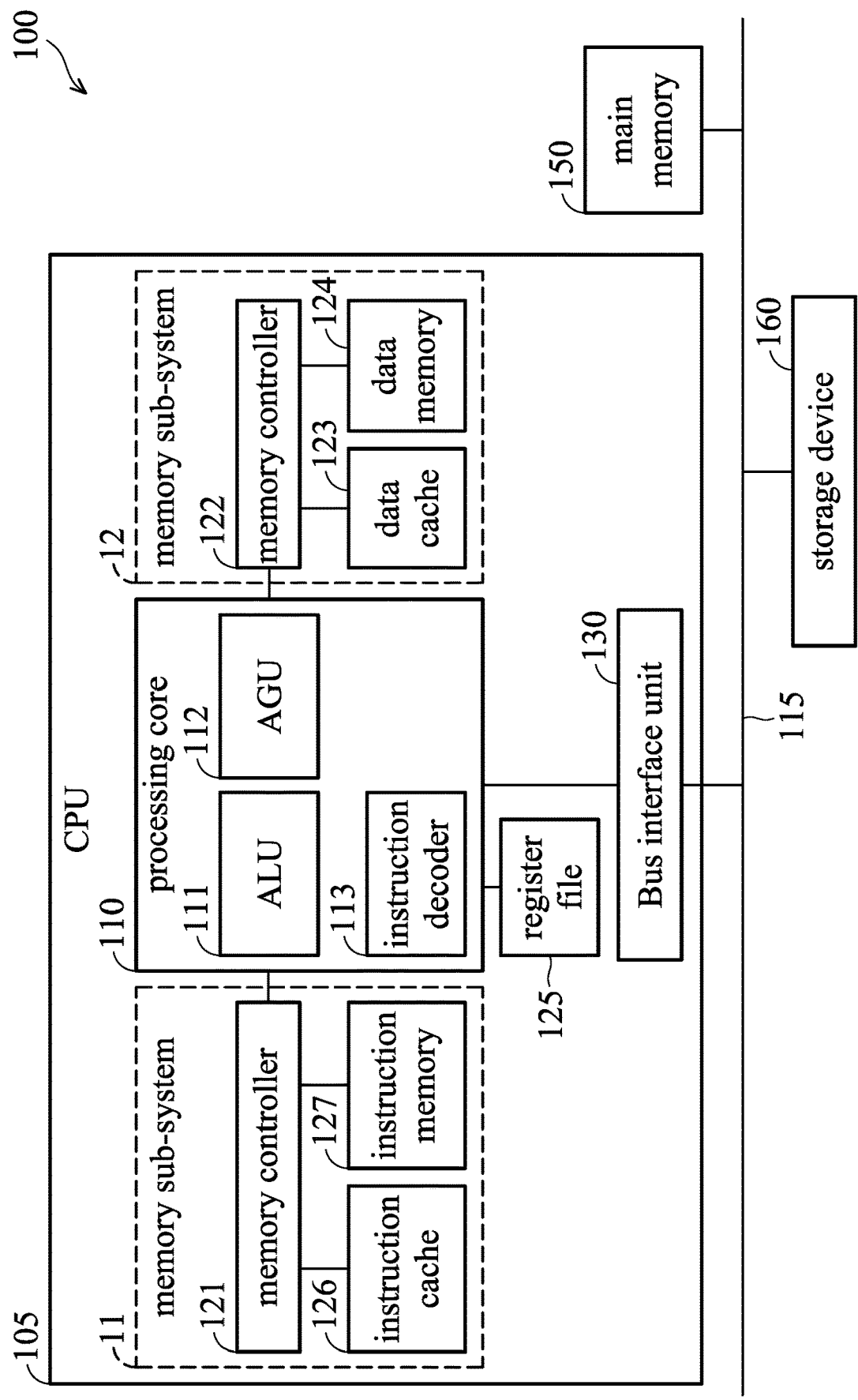
FIG. 1 is a block diagram of a semiconductor device in accordance with an embodiment of the disclosure.

FIG. 1 is a block diagram of a semiconductor device in accordance with an embodiment of the disclosure. As illustrated in FIG. 1, the semiconductor device 100 includes a central processing unit (CPU) 105, memory sub-systems 11 and 12, and a bus interface unit (BIU) 130. The CPU 105 is coupled to the main memory 150 and the storage device 160 via the system bus 115. The CPU 105 is configured to access instructions and/or data that are stored in the main memory 150. However, as will be appreciated by those of ordinary skill the art, the CPU 105 is intended to be illustrative and alternative embodiments may include other types of processor such as a graphics processing unit (GPU), a digital signal processor (DSP), an accelerated processing unit (APU), a co-processor, an applications processor, and the like in place of or in addition to the CPU 105. In the illustrated embodiment, the CPU 105 includes at least one processing core 110 that is used to execute the instructions and/or manipulate the data. Alternatively, the CPU 105 may include multiple processing cores 110 that work together with each other.

The CPU 105 also implements a hierarchical (or multi-level) cache system that is used to speed access to the instructions and/or data by storing selected instructions and/or data in the caches. However, persons of ordinary skill in the art having the benefit of the present disclosure should appreciate that alternative embodiments of the device 100 may implement different configurations of the CPU 105, such as configurations that use external caches. Moreover, the techniques described in the present application may be applied to other processors such as graphical processing units (GPUs), accelerated processing units (APUs), and the like.

The memory sub-system 11 includes a memory controller 121, an instruction cache 126, and an instruction memory 127. The instruction cache 126 and instruction memory 127 are used as L1 instruction (L1-I) memories. The memory sub-system 12 includes a memory controller 122, a data cache 123, and a data memory 124. The data cache 123 and data memory 124 are used as L1 data (L1-D) memories. For example, the data cache (D-cache) 123, data memory (D-memory) 124, instruction cache (I-cache) 126, and instruction memory (I-memory) 127 can be implemented by separate static random access memories (SRAMs), but the disclosure is not limited thereto. In some embodiments, the data memory 124 and instruction memory 127 may be tightly-coupled memories (TCMs).

The main memory 150 may be implemented by a dynamic random access memory (DRAM) which has a larger memory capacity, a longer access time, and higher power consumption than the data cache 123 and the data memory 124. The storage device 160 may be a non-volatile memory such as a hard-disk drive (HDD), a solid-state disk (SSD), a flash memory, or a read-only memory, but the disclosure is not limited thereto.

The data memory 124 and the data cache 123 may be equal or different from each other in size. For example, the data cache 123 has a first range of logical addresses, and the data memory 124 has a second range of logical addresses. The first range is independent from the second range, and does not overlap the second range. In an embodiment, the first range may be followed by the second range, and the logical addresses in the first range and those in the second range are consecutive. For example, the first range may be from address 0 to address M−1, and the second range may be from address M to address N−1, where M and N are positive integers, and N is greater than M. Alternatively, addresses in the first range and the second range are not consecutive.

Similarly, the instruction memory 127 and the instruction cache 126 may be equal or different from each other in size. For example, the instruction cache 126 has a third range of logical addresses, and the instruction memory 127 has a fourth range of logical addresses. The third range is independent from the fourth range, and does not overlap the fourth range. In an embodiment, the third range is followed by the fourth range, and the third range and the fourth range are consecutive in logical addresses. For example, the third range may be from address 0 to address P−1, and the second range may be from address P to address Q−1, where P and Q are positive integers, and Q is greater than P. Alternatively, addresses in the third range and the fourth range are not consecutive.

The memory controller 121 can be regarded as an L1 instruction-side controller. The memory controller 121 is configured to control activation and deactivation of instruction cache 126 and the instruction memory 127 in response to a program address and content information stored in a program counter. For example, the memory controller 121 may activate the instruction cache 126 and/or the instruction memory 127 according to the program address and content information stored in the program counter, and fetch an instruction from either the instruction cache 126 or the instruction memory 127. For example, the content information stored in the program counter may include the memory information. The memory information may indicate whether to activate either the instruction cache 126 or the instruction memory 127 in the instruction-fetch (IF) stage of the current instruction, and the memory information can be expressed by a two-bit value such as 2'b00, 2'b01, 2'b10, or 2'b11, where the most significant bit of the two-bit value indicates whether to activate the instruction cache 126 and the least significant bit of the two-bit value indicates whether to activate the instruction memory 127.

The memory controller 122 can be regarded as an L1 data-side controller. The memory controller 122 is configured to control access of data cache 123 and the data memory 124 in response to an access command from an address-generation unit (AGU) in the processing core 110. The memory controller 122 is further configured to control activation and deactivation of the data memory 124 and data cache 123. In an embodiment, either the data memory 124 or the data cache 123 is activated by the memory controller 122 according to address information and content information of the currently executed instruction from the address generator. In an embodiment, the memory controller 121 and memory controller 122 may include the function of a memory management unit (MMU) or a memory protection unit (MPU) that is capable of performing the translation of virtual memory addresses to physical addresses.

The register file 125 is an array of processor registers in the CPU 105. For example, the register file 125 may include a predetermined number of registers, and each register has a fixed width, where the predetermined number and width of registers depend on the architecture of the CPU 105. In an embodiment, the registers in the register file 125 may be general-purpose registers that store intermediate result data processed by the execution units of the CPU 105. Alternatively or additionally, the registers in the register file 125 may further include a stack pointer, a link register, a program counter (PC), a current program status register (CPSR), banked registers, etc., but the disclosure is not limited thereto.

In an embodiment, each register in the register file 125 further includes content information in addition to the original register value for its intended purpose. For example, the content information includes memory information and distance information. The memory information may indicate whether to activate either the data cache 123 or the data memory 124 in the execution stage of the current instruction, and the memory information can be expressed by a two-bit value such as 2'b00, 2'b01, 2'b10, or 2'b11, where the most significant bit of the two-bit value indicates whether to activate the data cache 123 and the least significant bit of the two-bit value indicates whether to activate the data memory 124.

Given that the two-bit value of the memory information is 2'b11, the memory controller 122 may activate both the data cache 123 and the data memory 124 while performing the memory-access operation of the current instruction. For example, the memory information of 2'b11 may be used for the initial condition because the memory controller 122 cannot determine whether the address to be accessed is located within the data cache 123 or the data memory 124. Given that the two-bit value of the memory information is 2'b10, the memory controller 122 may activate the data cache 123 and deactivate the data memory 124 while performing the memory-access operation of the current instruction. Given that the two-bit value of the memory information is 2'b01, the memory controller 122 may activate the data memory 124 and deactivate the data cache 123 upon performing the memory-access operation of the current instruction. Given that the two-bit value of the memory information is 2'b00, the memory controller 122 may deactivate both the data memory 124 and data cache 123 since the current instruction does not require access to the memory.

The distance information may indicate whether the distance from the current address to the boundary of the data cache 123 is more than a predetermined length such as 32 bytes, but the disclosure is not limited thereto. The distance information can be expressed by a 1-bit value that may help determine whether the address of the next instruction is located within the data cache 123 or the data memory 124.

In an embodiment, the content information may be changed due to arithmetic instructions (e.g., ADD, SUB, MPY, DIV, etc.), logic instructions (e.g., AND, OR, XOR, etc.), register-movement instructions, or memory-access instructions.

Figure 2:
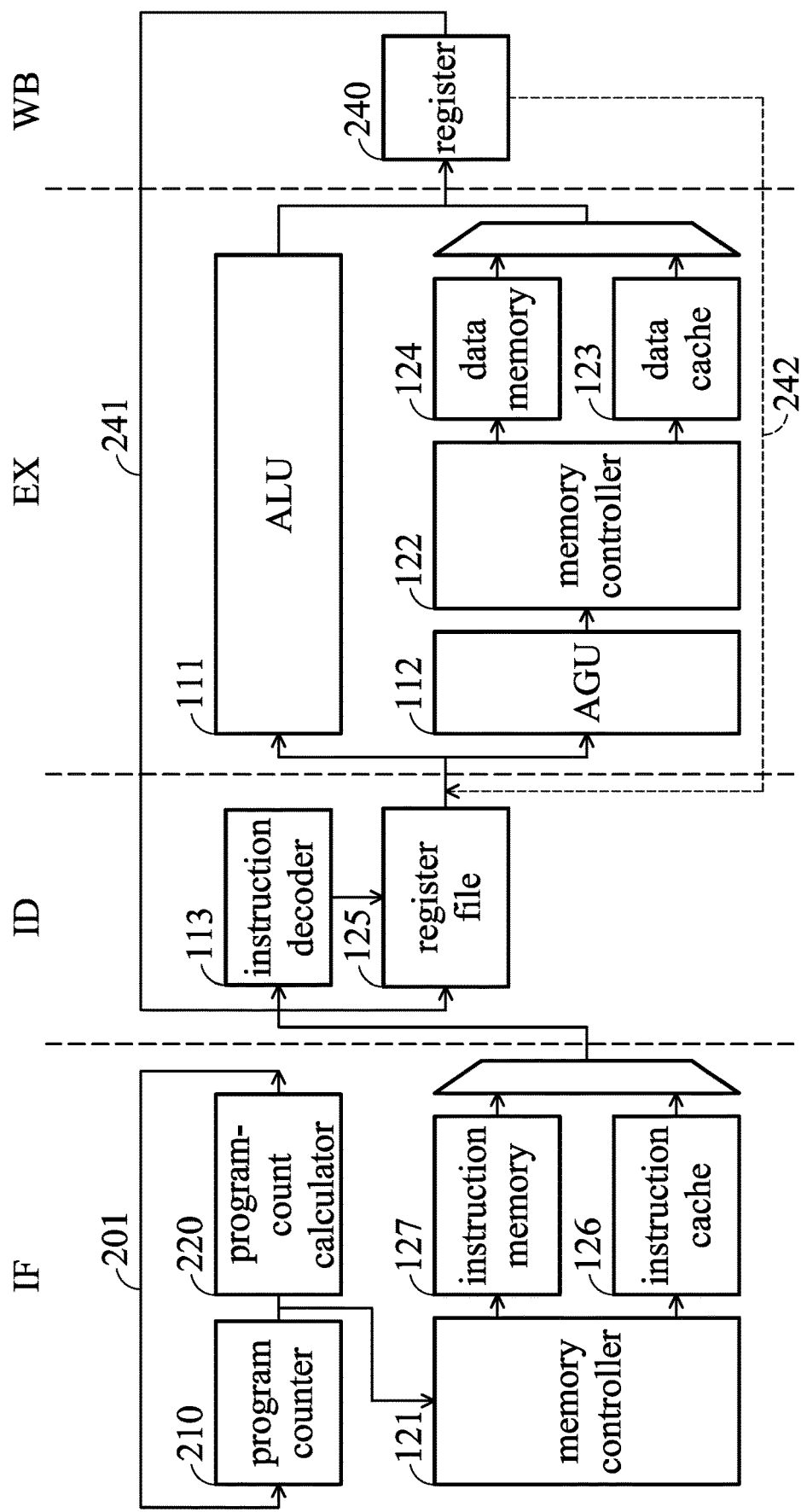
FIG. 2 is a block diagram of the instruction pipeline in the CPU in accordance with an embodiment of the disclosure.

FIG. 2 is a block diagram of the instruction pipeline in the CPU in accordance with an embodiment of the disclosure.

In an embodiment, the instruction pipeline in the CPU 105 can be divided into four stages such as an instruction-fetch (IF) stage, an instruction-decode (ID) stage, an execution (EX) stage, and a write-back (WB) stage. These stages are arranged so that a new instruction is stored in an input register of each stage as the result calculated in that stage is stored in an input register of a subsequent stage. For example, in the IF stage of the current instruction, the processing core 110 may read the program address stored in the program counter (PC), and then fetch the current instruction from either the instruction cache 126 or instruction memory 127 into the instruction register (not shown) according to the program address stored in the program counter. In an embodiment, the program counter may be one of the registers in the register file 125, or a standalone register.

In an embodiment, the program counter also includes the content information in addition to the program address. For example, the content information stored in the program counter may indicate whether to activate and deactivate the instruction cache 126 and/or the instruction memory 127 in the IF stage of the current instruction. In addition, the memory controller 121 may determine whether to activate and deactivate the instruction cache 126 and/or the instruction memory 127 in the IF stage of the current instruction according to both the program address and content information stored in the program counter, where the details will be described later.

During the ID stage, an instruction decoder 113 of the processing core 110 may decode the fetched instruction, retrieve operands associated with the decoded instruction from one or more registers in the register file 125, and write the retrieved operands to one or more instruction registers During the EX stage, the processing core 110 and the memory controller 122 may retrieve the address of the current instruction from the instruction registers. For example, if the current instruction is a memory-access instruction, an address-generation unit (AGU) 112 of the processing core 110 may calculate the memory address for fetching data from the data cache 123 and/or data memory 124 by the memory controller 122. During the EX stage, the arithmetic logic unit (ALU) 111 of the processing core 110 may also perform arithmetic operations (e.g., ADD, SUB, MPY, DIV, SHIFT, etc.) and/or logic operations (e.g., AND, OR, NOT, NAND, NOR, XOR, XNOR, etc.) of the currently executed instruction, and the operations that are performed may take one or more clock cycles depending on the type of the instruction. In addition, the memory controller 122 may generate the content information indicating whether to activate the data cache 123 and/or data memory 124 for the next instruction. The results of the EX stage and the calculation information are stored in the register 240 which is a stage register.

During the WB stage, the memory controller 122 (or the processing core 110) may update the value stored in the register 240 to an associated register in the register file 125. It should be noted that the registers in the register file 125 may include the updated content information after the WB stage, and the registers with the updated content information in the register file 125 can be used in the EX stage of the next instruction or an instruction performed later. Specifically, there is a "forwarding path" 241 for the registers with the updated content information, so that the content information updated in the WB stage (i.e., the fourth stage) of the instruction currently being performed can be used in the EX stage (i.e., the third stage) of the next instruction or an instruction performed later. Alternatively or additionally, there is another forwarding path 242 between inputs and the register 240 (e.g., a stage register) storing the results of the EX stage and the content information. For example, during the EX stage, the memory controller 122 (or the processing core 110) may also write the calculated content information into the register 240, such that the value and content information stored in the register 240 can be immediately used as inputs of the EX stage of the next instruction, thereby reducing possible stalling in the instruction pipeline.

For purposes of description, the CPU 105 may be a 32-bit CPU, and the register file 125 may include 16 registers, and each register in the register file 125 has a width of 32 bits plus 3 additional bits of the content information (e.g., 2-bit value) and distance information (e.g., 1-bit value), but the disclosure is not limited thereto.

In an embodiment, during the instruction-fetch stage, there are two types of instruction fetches in the CPU 105 such as a sequential fetch and a non-sequential fetch. For example, if a sequential fetch is performed, this means that the program counter (PC) value for the next instruction is calculated by adding the instruction length of the current instruction to the current program counter value, which can be expressed by equation (1):

$$\text{Next\_PC} = \text{Current\_PC} + \text{instruction\_length} \qquad (1)$$

Table 1 shows an example of instructions with sequential fetches performed by the CPU 105 in accordance with an embodiment of the disclosure.

TABLE 1

| PC | Instruction | Seq. PC | Memory Info. |
|---|---|---|---|
| 0 × 00 | ADD, R0 R1, R2 | PC + 0 × 4 | 2'b11 |
| 0 × 04 | NOP | PC + 0 × 4 | 2'b10 |
| 0 × 08 | SUB, R3, R4, R5 | PC + 0 × 4 | 2'b10 |
| 0 × 0C | NOP | PC + 0 × 4 | 2'b10 |
| 0 × 10 | NOP16 | PC + 0 × 4 | 2'b10 |
| 0 × 12 | MPY, R7, R8, R9 | PC + 0 × 4 | 2'b10 |

In an embodiment, the program counter 210 does not include the content information. While performing the first instruction "ADD", the memory controller 121 activates and fetches both the instruction cache 126 and instruction memory 127, and the program-count calculator 220 calculates the program counter value Next_PC for the next instruction by adding the instruction length of ADD (e.g., 4 bytes) to the current program counter value Current_PC (e.g., 0×0), thereby obtaining the program counter value Next_PC=0×0+0×4=0×4. While performing the second instruction "NOP", the memory controller 121 also activates and fetches both the instruction cache 126 and instruction memory 127, and the program-count calculator 220 calculates the program counter value Next_PC for the next instruction by adding the instruction length of NOP (e.g., 4 bytes) to the current program counter value Current_PC (e.g., 0×4), thereby obtaining the program counter value Next_PC=0×4+0×4=0×8.

While performing the third instruction "SUB", the memory controller 121 also activates and fetches both the instruction cache 126 and instruction memory 127, and the program-count calculator 220 calculates the program counter value Next_PC for the next instruction by adding the instruction length of SUB (e.g., 4 bytes) to the current program counter value Current_PC (e.g., 0×8), thereby obtaining the program counter value Next_PC=0×8+0×4=0×C. While performing the fourth instruction "NOP", the memory controller 121 also activates and fetches both the instruction cache 126 and instruction memory 127, and the program-count calculator 220 calculates the program counter value Next_PC for the next instruction by adding the instruction length of NOP (e.g., 4 bytes) to the current program counter value Current_PC (e.g., 0×C), thereby obtaining the program counter value Next_PC=0×C+0×4=0×10.

It should be noted that the length of some instructions, such as "NOP16", is not aligned with the width of instruction set defined by the CPU 105. For example, while performing the fifth instruction "NOP16", the memory controller 121 also activates and fetches both the instruction cache 126 and instruction memory 127, and the program-count calculator 220 calculates the program counter value Next_PC for the next instruction by adding the instruction length of NOP16 (e.g., 2 bytes) to the current program counter value Current_PC (e.g., 0×10), thereby obtaining the program counter value Next_PC=0×10+0×2=0×12. While performing the sixth instruction "MPY", the memory controller 121 also activates and fetches both the instruction cache 126 and instruction memory 127, and the program-count calculator 220 calculates the program counter value Next_PC for the next instruction by adding the instruction length of NOP (e.g., 4 bytes) to the current program counter Current_PC (e.g., 0×12), thereby obtaining the program counter value Next_PC=0×12+0×4=0×16. The program counter for the next instruction can be calculated in a similar manner described above.

In another embodiment, the program counter 210 includes the content information (i.e., memory information in Table 1). While performing the first instruction "ADD", the memory controller 121 activates and fetches both the instruction cache 126 and instruction memory 127, and the program-count calculator 220 calculates the program counter value Next_PC for the next instruction by adding the instruction length of ADD (e.g., 4 bytes) to the current program counter value Current_PC (e.g., 0×0), thereby obtaining the program counter value Next_PC=0×0+0×4=0×4. For example, in the initial condition, the content information stored in the program counter 210 about whether to activate the instruction cache 126 and/or instruction memory 127 is empty. Thus, the memory controller 121 cannot determine the exact location of the program address stored in the program counter 210 is located within the instruction cache 126 or the instruction memory 127, and the memory controller 121 has to activate both the instruction cache 126 and instruction memory 127. Then, the memory controller 121 may check the memory attribute of the calculated program counter value of the next instruction Next_PC (i.e., 0×4) to determine whether the calculated program counter value Next_PC is located in the instruction cache 126 or instruction memory 127. In the embodiment, the memory controller 121 may determine that the address 0×4 of the calculated program counter value Next_PC is located in the instruction cache 126, and update the content information to the program counter 210 with 2'b10 (i.e., path 201).

While performing the second instruction "NOP", the memory controller 121 activates and fetches the instruction cache 126 according to the content information stored in the program counter 210, and the program-count calculator 220 calculates the program counter value Next_PC for the next instruction by adding the instruction length of NOP (e.g., 4 bytes) to the current program counter value Current_PC (e.g., 0×4), thereby obtaining the program counter Next_PC=0×4+0×4=0×8. In the embodiment, the memory controller 121 may determine that the address 0×8 of the calculated program counter value Next_PC is located in the instruction cache 126, and update the content information to the program counter 210 with 2'b10. Similarly, in the following instructions in Table 1, the memory controller 121 may determine that the address of the calculated program counter value Next_PC is located in the instruction cache 126, and update the content information to the program counter 210 with 2'b10. Accordingly, the memory controller 121 may activate and fetch the instruction cache 126 according to the content information stored in the program counter while performing each of the third, fourth, fifth, and sixth instructions in Table 1. Specifically, while performing each of the remaining instructions in Table 1, in addition to calculating the program counter value Next_PC of the next instruction, the memory controller 121 may check the memory attribute of the calculated program counter value Next_PC of the next instruction to determine whether the calculated program counter value Next_PC is located in the instruction cache 126 or instruction memory 127, and update the content information to the program counter 210.

The CPU 105 usually fetches instructions sequentially from the L1 instruction memories (i.e., may be the instruction cache 126 or instruction memory 127), but control-transfer instructions change the sequence by placing a new value in the program counter (i.e., non-sequential fetch).

These include branches (sometimes called jumps), subroutine calls, and returns. A transfer that is conditional on the truth of some assertion (e.g., if-else condition) lets the computer follow a different sequence under different conditions. For example, a branch provides that the next instruction is fetched from elsewhere in the memory. A subroutine call not only branches but saves the preceding contents of the PC somewhere. A return retrieves the saved contents of the PC and places it back in the PC, resuming sequential execution with the instruction following the subroutine call.

In an embodiment, the CPU 105 may execute the following codes:

```
{
A=B+C; //B=1, C=1
If (A>0)
    function_0(A);
Else
    function_1(A);
}
```

These codes can be compiled into instructions having non-sequential fetches shown in Table 2.

TABLE 2

| PC | Instruction | Seq. PC | Memory Info. |
|---|---|---|---|
| 0 × 00 | ADD, R0, R1, R2 | PC + 0 × 4 | 2'b11 |
| 0 × 04 | If (A > 0)<br>PC = 0 × C<br>Else<br>PC = 0 × 8 | PC + 0 × 4 | 2'b10 |
| 0 × 0C | Function_0<br>PC = 0 × 2000 | PC + 0 × 4 | 2'b10 |
| 0 × 2000 | MPY, R7, R8, R9 | PC + 0 × 4 | 2'b10 |
| 0 × 2004 | NOP | PC + 0 × 4 | 2'b01 |

In the embodiment of Table 2, it is assumed that the range of the instruction cache 126 is from address 0×0 to address 0×1FFF and the range of the instruction memory 127 is from address 0x2000 to 0x3FFF.

In an embodiment, the program counter does not include the content information. While performing the first instruction "ADD", the memory controller 121 may activate both the instruction cache 126 and instruction memory 127 and fetch an instruction from either the instruction cache 126 or the instruction memory 127, and the program-count calculator 220 may calculate the program counter value Next_PC for the next instruction by adding the instruction length of ADD (e.g., 4 bytes) to the current program counter value Current_PC (e.g., 0×0), thereby obtaining the program counter value Next_PC=0×0+0×4=0×4.

While performing the second instruction, the memory controller 121 may also activate both the instruction cache 126 and instruction memory 127 and fetch an instruction from either the instruction cache 126 or the instruction memory 127, and the program-count calculator 220 may calculate the program counter value Next_PC for the next instruction by adding the instruction length of the current instruction (e.g., 4 bytes) to the current program counter value Current_PC (e.g., 0×04), thereby obtaining the program counter value Next_PC=0×4+0×4=0×8. However, the program counter value Next_PC is set to 0×C by the second instruction, and thus the processing core 110 may perform the instruction at address 0×C as the third instruction.

In the third instruction, function_0 is executed. The memory controller 121 also activates and fetches both the instruction cache 126 and instruction memory 127, and the program-count calculator 220 calculates the program counter value Next_PC for the next instruction by adding the instruction length of the current instruction (e.g., 4 bytes) to the current program counter value Current_PC (e.g., 0×C), thereby obtaining the program counter value Next_PC=0× C+0×4=0×10. However, the program counter value Next_PC is set to 0x2000 by the third instruction, and thus the processing core 110 may perform the instruction at address 0x2000 as the fourth instruction.

While performing the fourth instruction "MPY", the memory controller 121 activates both the instruction cache 126 and instruction memory 127, and the program-count calculator 220 calculates the program counter value Next_PC for the next instruction by adding the instruction length of MPY (e.g., 4 bytes) to the current program counter value Current_PC (e.g., 0x2000), thereby obtaining the program counter value Next_PC=0x2000+0×4=0x2004. While performing the fifth instruction, the memory controller 121 may also activate both the instruction cache 126 and instruction memory 127 and fetch an instruction from either the instruction cache 126 or the instruction memory 127, and the program-count calculator 220 may calculate the program counter value Next_PC for the next instruction by adding the instruction length of the current instruction (e.g., 4 bytes) to the current program counter value Current_PC (e.g., 0x2004), thereby obtaining the program counter value Next_PC=0x2004+0×4=0x2008.

Specifically, no matter whether sequential fetches or non-sequential fetches are performed, if the program counter 210 does not include the content information, the memory controller 121 has to activate both the instruction cache 126 and instruction memory 127 and fetch an instruction from either the instruction cache 126 or the instruction memory 127 while performing each memory-access instruction, resulting in higher power consumption of the semiconductor device 100.

In another embodiment, the program counter 210 includes the content information which indicates whether to activate the instruction cache 126 and/or instruction memory 127. While performing the first instruction "ADD", the memory controller 121 may activate both the instruction cache 126 and instruction memory 127 and fetch an instruction from either the instruction cache 126 or the instruction memory 127, and the program-count calculator 220 may calculate the program counter value Next_PC for the next instruction by adding the instruction length of ADD (e.g., 4 bytes) to the current program counter value Current_PC (e.g., 0×0), thereby obtaining the program counter value Next_PC=0× 0+0×4=0×4. For example, in the initial condition, the content information stored in the program counter 210 about whether to activate the instruction cache 126 and/or instruction memory 127 is empty. Thus, the memory controller 121 has to activate and fetch both the instruction cache 126 and instruction memory 127. Then, the memory controller 121 may check the memory attribute of the calculated program counter value Next_PC of the next instruction (i.e., 0×4) to determine whether the calculated program counter value Next_PC is located within the instruction cache 126 or instruction memory 127. In the embodiment, the memory controller 121 may determine that the address 0×4 of the calculated program counter value Next_PC is located in the instruction cache 126, and update the calculated program counter value and the content information to the program counter 210.

While performing the second instruction in Table 2, the memory controller 121 may activate either the instruction cache 126 or instruction memory 127 and fetch an instruction from the activated instruction cache 126 or the activated instruction memory 127. Then, the program-count calculator 220 calculates the program counter value Next_PC for the next instruction by adding the instruction length of the current instruction (e.g., 4 bytes) to the current program counter value Current_PC (e.g., 0×4), thereby obtaining the program counter value Next_PC=0×4+0×4=0×8. However, the program counter value Next_PC is set to 0×C by the second instruction, and thus the processing core 110 may perform the instruction at address 0×C as the third instruction. Then, the memory controller 121 may check the memory attribute of the calculated program counter value Next_PC of the next instruction (i.e., 0×8) to determine that the calculated program counter value Next_PC is located in the instruction cache 126 which indicates the memory information for the next instruction is 2'b10. Accordingly, the memory controller 121 may update the program counter value Next_PC and the content information (e.g., 2'b10) into the program counter 210.

However, the calculated program counter value Next_PC (e.g., 0×8) is not equal to the actual program address (e.g., 0×C) of the third instruction. Accordingly, the content information stored in the program counter 210 for the third instruction is invalid, and the memory controller 121 may activate both the instruction cache 126 and instruction memory 127 and fetch data from either the instruction cache 126 or the instruction memory 127 while performing the third instruction. Then, the program-count calculator 220 calculates the program counter value Next_PC for the next instruction by adding the instruction length of the current instruction (e.g., 4 bytes) to the current program counter value Current_PC (e.g., 0×C), thereby obtaining the program counter value Next_PC=0×C+0×4=0×10. Meanwhile, the memory controller 121 may determine that the calculated program counter value Next_PC is located within the instruction cache 126 which indicates that the memory information of the next instruction is 2'b10. However, the program counter value Next_PC is set to 0x2000 by the third instruction, and thus the processing core 110 may perform the instruction at address 0x2000 as the fourth instruction.

Similarly, the calculated program counter value Next_PC (e.g., 0×10) stored in the program counter 210 is not equal to the actual program address (e.g., 0x2000) of the fourth instruction. Accordingly, the content information stored in the program counter 210 for the fourth instruction is invalid, and the memory controller 121 may activate both the instruction cache 126 and instruction memory 127 and fetch data from either the instruction cache 126 or the instruction memory 127 while performing the fourth instruction. Then, the program-count calculator 220 may calculate the program counter Next_PC for the next instruction by adding the instruction length of MPY (e.g., 4 bytes) to the current program counter Current_PC (e.g., 0x2000), thereby obtaining the program counter value Next_PC=0x2000+0×4=0x2004. Meanwhile, the memory controller 121 may determine that the calculated program counter value Next_PC is located within the instruction memory 127 which indicates that the memory information of the next instruction is 2'b01.

Since the calculated program counter value Next_PC (e.g., 0x2004) stored in the program counter 210 is equal to the actual program address (e.g., 0x2004) of the fifth instruction, the content information for the fifth instruction is valid. While performing the fifth instruction, the memory controller 121 may activate the instruction memory 127 and deactivate the instruction cache 126, and fetch an instruction from the instruction memory 127. Then, the program-count calculator 220 calculates the program counter Next_PC for the next instruction by adding the instruction length of the current instruction (e.g., 4 bytes) to the current program counter Current_PC (e.g., 0x2004), thereby obtaining the program counter Next_PC=0x2004+0×4=0x2008. Then, the memory controller 121 may check the memory attribute of the calculated program counter of the next instruction Next_PC (i.e., 0x2008), and determine that the calculated program counter Next_PC is located within the instruction memory 127 which indicates that the memory information for the next instruction is 2'b01.

Specifically, if the program counter 210 includes the content information, it is possible for the memory controller 121 to precisely activate and fetch either the instruction cache 126 or the instruction memory 127 without "prediction" while performing a memory-access instruction, thereby reducing power consumption of the semiconductor device 100. The memory controller 121 (or the processing core 110) may update the program counter 210 with the calculated program counter value and the content information for the next instruction each time an instruction is fetched at the IF stage.

In an embodiment, the content information can be used in the load or store instructions to reduce power consumption of the EX stage. For example, there are two modes of the load or store instructions, such as an offset mode and a post-modify mode. In the offset mode, the input address of the load instruction Load (Rd, Rs+Offset) is a base address Rs plus an offset (i.e., Rs+Offset), and the value from address (Rs+Offset) is loaded into the register Rd, where the base address Rs is unmodified.

Table 3 shows the possible operations of the load instruction using the offset mode.

TABLE 3

| Base Addr | Mem. Info. | Distance Info. | Offset | Active Memory |
|---|---|---|---|---|
| Rs | 2'b10 | 0 | 0 × 0 | D-Cache |
| Rs | 2'b10 | 0 | >0 | D-Cache & D-Memory |
| Rs | 2'b10 | 1 | <= 32 bytes | D-Cache |

Referring to Table 3, it is assumed that the base address Rs is within the address range of the data cache 123.

In the first case, the memory information is 2'b10, and the distance information is 0, and the offset is 0×0. The memory information indicates that the data cache 123 should be activated and the data memory 124 should be deactivated in the EX stage, and the distance information indicates that the distance from the base address Rs to the boundary of the data cache 123 is less than 32 bytes. Since the offset of the load instruction is 0×0, the summation value of (Rs+Offset) is equal to the base address Rs, and thus is within the address range of the data cache 123. As a result, the memory controller 122 may activate the data cache 123 and deactivate the data memory 124 in the EX stage of the load instruction, thereby loading the value at the address Rs in the data cache 123 to the register Rd.

The conditions in the second case are similar to those in the first case except for the offset being greater than 0. Since the distance from the base address Rs to the boundary of the data cache 123 is less than 32 bytes, the summation value of (Rs+Offset) may exceed the boundary of the data cache 123. Accordingly, the memory controller 122 cannot precisely determine whether the input address (Rs+Offset) of the load instruction is located within the data cache 123 or the data memory 124 in the EX stage of the current instruction. Thus, the memory controller 122 may activate both the data cache 123 and the data memory 124 in the EX stage of the load instruction, thereby loading the value at the address (Rs+Offset) in the data cache 123 or the data memory 124 to the register Rd.

In the third case, the memory information is 2'b10, and the distance information is 1, and the offset is smaller than or equal to 32 bytes. Since the distance from the base address Rs to the boundary of the data cache 123 is more than 32 bytes and the offset is smaller than or equal to 32 bytes, the summation value of (Rs+Offset) will not exceed the boundary of the data cache 123. Accordingly, the memory controller 122 may determine that the input address (Rs+Offset) of the load instruction is located within the address range of the data cache 123. As a result, the memory controller 122 may activate the data cache 123 and deactivate the data memory 124 in the EX stage of the load instruction, thereby loading the value at the address (Rs+Offset) in the data cache 123 to the register Rd.

In the post-modify mode, the input address of the load instruction Load (Rd, Rs+=Offset) is the base address Rs, and the value from the base address Rs is loaded in to the register Rd, where the value of the base address Rs is modified to (Rs+Offset) after the load instruction is performed.

In an embodiment, it is assumed that the base address Rs is within the address range of the data cache 123, and the memory information, the distance information, and the current offset is 2'b10, 0, and 0×0, respectively. Since the base address Rs is modified to (Rs+Offset) after loading the value from the base address Rs into the register Rd, the distance information and the current offset will not affect the determination for activating or deactivating the data cache 123 and/or the data memory 124. Accordingly, the memory controller 122 may activate the data cache 123 and deactivate the data memory 124 in the EX stage of the load instruction in the post-modify mode, thereby loading the value at the base address (Rs) in the data cache 123 to the register Rd.

Figure 3:
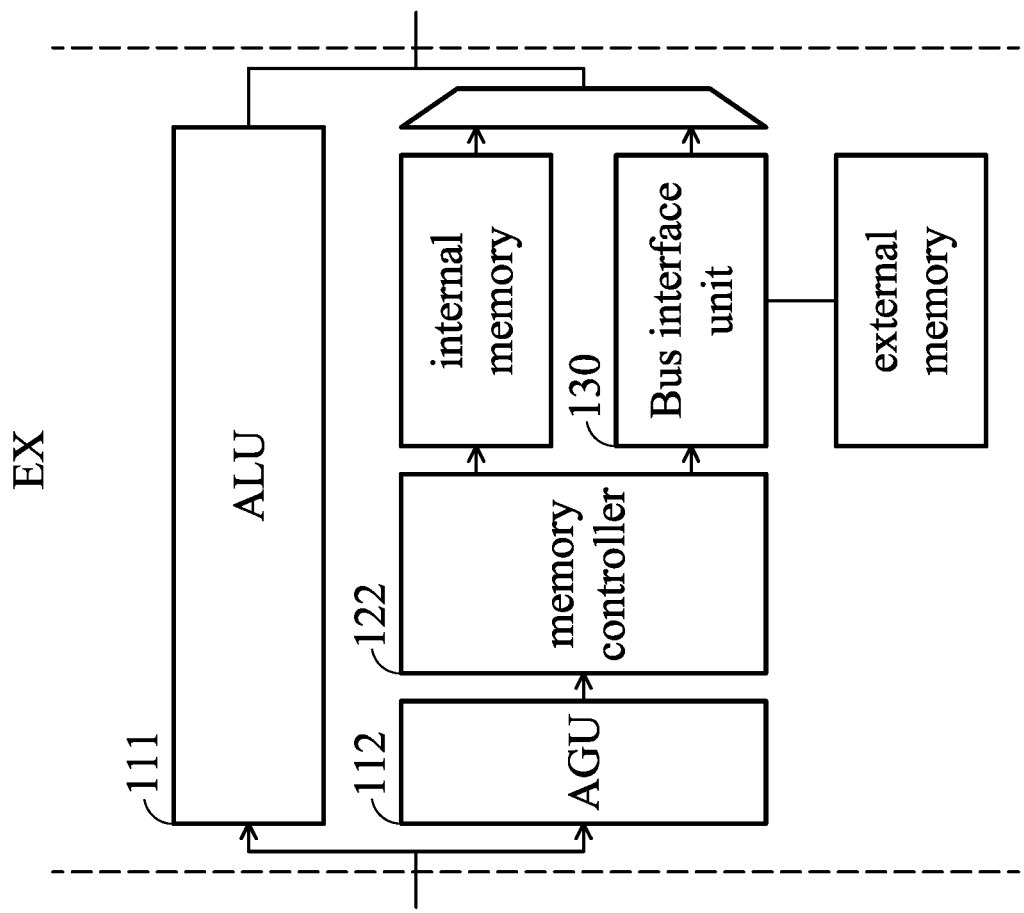
FIG. 3 is a block diagram of the EX stage in the instruction pipeline of the CPU in accordance with another embodiment of the disclosure.

FIG. 3 is a block diagram of the EX stage in the instruction pipeline of the CPU in accordance with another embodiment of the disclosure. Referring to FIG. 1 and FIG. 3, in another embodiment, the content information stored in each register of the register 125 may help determine whether the address to be accessed belongs to one of the internal memories (e.g., the data cache 123 or data memory 124) or an external memory. The external memory may be the main memory 150 or the storage device 160.

Specifically, the access time (i.e., latency) of the external memory is much longer than that of the internal memory. As a result, if the memory controller 122 is about to access data from either the internal memory or the external memory, the memory controller 122 has to ensure that the exact location of the address to be accessed. If the memory controller 122 erroneously fetches data from the external memory, tens or hundreds of clock cycles will be wasted, and then the memory controller 122 has to discard the data fetched from the external memory and fetch correct data from the internal memory. In addition, speculative access of the external memory will cause heavy traffic to the system bus 115, and the result of the speculative access may be possibly wrong. Therefore, the speculative access to the external memory is not allowed by the memory controller 122, and the memory controller 122 may start to read data from either the internal memory or the external memory after the memory controller 122 has determined the exact location of the address to be accessed according to the address information from the AGU 112 and the content information from the register file 125. In other words, the memory controller 122 will wait for the exact memory attribute information and then determine whether to fetch the internal memory or external memory (i.e., assuming that the internal memory and external memory are activated), thereby reducing the latency of the CPU 105.

Table 4 shows the possible operations of the load instruction using the offset mode.

TABLE 4

| Base Addr | Mem. Info. | Distance Info. | Offset | Waiting for Memory Attribute |
|---|---|---|---|---|
| Rs | 2'b10 | 0 | 0 × 0 | No |
| Rs | 2'b10 | 0 | >0 | Yes |
| Rs | 2'b10 | 1 | <= 32 bytes | No |

Referring to Table 4, it is assumed that the base address Rs is within the address range of the internal memory (i.e., the data cache 123 and data memory 124).

Table 4 is very similar to Table 3. However, in the embodiment of Table 4, the memory controller 122 has to determine whether to fetch data from either the internal memory or the external memory, and the external memory is only accessed by the upon need.

For example, in the first case of Table 4, the memory information is 2'b10, and the distance information is 0, and the offset is 0×0. Since the offset of the load instruction is 0×0, the summation value of (Rs+Offset) is equal to Rs that is within the address range of the internal memory. Accordingly, the memory controller 122 may quickly determine that the address to be accessed is located within the internal memory. Thus, the memory controller 122 does not need to wait for the address information from the AGU 112, and may fetch data from the internal memory in the EX stage of the load instruction, thereby loading the value at the address Rs in the internal memory to the register Rd.

The conditions in the second case are similar to those in the first case except for the offset being greater than 0. Since the distance from the base address Rs to the boundary of the internal memory is less than 32 bytes, the summation value of (Rs+Offset) may exceed the boundary of the internal memory. Accordingly, the memory controller 122 cannot precisely determine whether the input address (Rs+Offset) of the load instruction is located within the internal memory or the external memory in the second case. Thus, the memory controller 122 has to wait for the address information from the AGU 112, and determines whether the address to be accessed is located within the internal memory or the external memory according to the address information. If the address information from the AGU 112 indicates that the address to be accessed is located within the internal memory, the memory controller 122 may fetch data from the internal memory in the EX stage of the load instruction, thereby loading the value at the address (Rs+Offset) in the data cache 123 or the data memory 124 to the register Rd. Conversely, if the address information from the AGU 112 indicates that the address to be accessed is located within the external memory, the memory controller 122 may fetch data from the external memory in the EX stage of the load instruction, thereby loading the value at the address (Rs+Offset) in the external memory to the register Rd.

In the third case, the memory information is 2'b10, and the distance information is 1, and the offset is smaller than or equal to 32 bytes. Since the distance from the base address Rs to the boundary of the data cache 123 is more than 32 bytes and the offset is smaller than or equal to 32 bytes, the summation value of (Rs+Offset) will not exceed the boundary of the data cache 123. Accordingly, the memory controller 122 may quickly determine that the input address (Rs+Offset) of the load instruction is located within the address range of the data cache 123. Thus, the memory controller 122 may fetch data from the internal memory in the EX stage of the load instruction, thereby loading the value at the address (Rs+Offset) in the internal memory to the register Rd.

Similarly, in the post-modify mode, the input address of the load instruction Load (Rd, Rs+=Offset) is the base address Rs, and the value from the address Rs is loaded in to the register Rd, where the address Rs is modified to (Rs+Offset) for the next operation.

In an embodiment, it is assumed that the base address Rs is within the address range of the data cache 123, and the memory information, the distance information, and the current offset is 2'b10, 0, and 0×0, respectively. Since the address Rs is modified to (Rs+Offset) after loading the value from address Rs of the data cache 123 into the register Rd, the distance information and the current offset will not affect the determination for fetching the internal memory or the external memory. Accordingly, the memory controller 122 may fetch data from the internal memory in the EX stage of the load instruction in the post-modify mode, thereby loading the value at the address (Rs) in the internal memory to the register Rd.

In some embodiments, the techniques described in the embodiment of Table 3 can be incorporated with the techniques described in the embodiment of Table 4. Specifically, the memory information in the content information can be extended to three or more bits, and the distance information can be extended to two or more bits. If there are three memories to be accessed, such as the data cache 123, data memory 124, and main memory 150, the 3-bit value of the memory information may indicate whether to access the internal memory (i.e., including the data cache 123 and data memory 124) or the external memory (i.e., main memory 150) and whether to activate and fetch either the data cache 123 or the data memory 124.

For example, the most significant bit of the 3-bit value may indicate whether to activate and fetch data from the data cache 123. The second most significant bit of the 3-bit value indicates whether to activate and fetch data from the data memory 124. The least significant bit of the 3-bit value indicates whether to fetch data from the main memory 150.

In other words, the memory controller 122 may access one of the data cache 123, data memory 124, and main memory 150 in the EX stage. If the memory controller 122 cannot determine whether to access the internal memory (e.g., the data cache 123 or data memory 124) or external memory (e.g., main memory 150) according to the content information, the memory controller 122 has to wait for the address information from the AGU 112 to determine whether the exact location of the address to be accessed is located within the internal memory or external memory. If the memory controller 122 can determine to access the internal memory according to the content information, the memory controller 122 may further determine whether to activate and fetch data from the data cache 123 or data memory 124 using the techniques described in the embodiment of Table 3. If the memory controller 122 can determine to access the external memory according to the content information, the memory controller 122 may send a memory-access command to the external memory through the bus interface unit 130.

Table 5 shows a timing diagram of the instruction pipeline in the CPU in accordance with the embodiment of FIG. 2.

TABLE 5

| | Clock Cycle | | | | | |
|---|---|---|---|---|---|---|
| | 1 | 2 | 3 | 4 | 5 | 6 |
| Instruction 0 | IF | ID | EX | WB | | |
| Instruction 1 | | IF | ID | EX | WB | |
| Instruction 2 | | | IF | ID | EX | WB |
| Current Memory Info. | — | — | N/A | D-Cache | D-Cache | D-Memory |
| Distance Info | — | — | — | 1 | 1 | — |
| Activated Memory | — | — | D-Cache & D-Memory | D-Cache | D-Cache | — |
| Next Memory Info | — | — | D-Cache | D-Cache | D-Memory | — |

In an embodiment, the timing of various instructions in the instruction pipeline of the CPU 105 and the content information are shown in Table 5. For example, the instruction pipeline of the CPU 105 (e.g., a reduced instruction set computing (RISC) processor) can be divided into the IF, ID, EX, and WB stages. It is assumed that instructions 0, 1, 2 are memory-access instructions. The column "Current Memory Info" refers to the memory information for the EX stage. The column "Activated Memory" refers to the activated memory at the EX stage (i.e., may be the data cache 123, data memory 124, or both). In addition, the forwarding path 242 is used in the embodiment.

In clock cycle 1, the IF stage of instruction 0 is performed, and no content information can be referenced.

In clock cycle 2, the ID stage of instruction 0 and the IF stage of instruction 1 are performed, and no content information can be referenced.

In clock cycle 3, the EX stage of instruction 0, the ID stage of instruction 1, and the IF stage of instruction 2 are performed. Since there is still no content information that can be referenced in the EX stage of instruction 0, the memory controller 122 cannot determine whether the address to be accessed is located within the data cache 123 or data memory 124. Thus, the memory controller 122 activates both the data cache 123 and data memory 124 in clock cycle 3. Meanwhile, the memory controller 122 and/or the processing core 110 may determine that the memory information for the next instruction (i.e., instruction 1) refers to the data cache 123. For example, the memory controller 122 and/or the processing core 110 may write the result of the EX stage for instruction 0 and the content information for the next instruction (i.e., instruction 1) into register 240.

In clock cycle 4, the WB stage of instruction 0, the EX stage of instruction 1, and the ID stage of instruction 2 are performed. The memory controller 122 may update the register file 125 with the data stored in register 240. Meanwhile, the content information stored in register 240 can be forward to the EX stage of instruction 1 in clock cycle 4, such that the memory controller 122 may determine that the memory information indicates the data cache 123 to be activated and the distance information is within the boundary of the data cache 123. Thus, the memory controller 122 may activate the data cache 123 and deactivate the data memory 124 in the EX stage of instruction 1 in clock cycle 4. Meanwhile, the memory controller 122 and/or the processing core 110 may determine that the memory information for the next instruction (i.e., instruction 2) refers to the data cache 123.

In clock cycle 5, the WB stage of instruction 1 and the EX stage of instruction 2 are performed. The memory controller 122 may update the data stored in register 240 into the register file 125. Meanwhile, the content information generated in clock cycle 4 can be forward to the EX stage of instruction 2 in clock cycle 5, such that the memory controller 122 may determine that the memory information indicates the data cache 123 to be activated and the distance information is within the boundary of the data cache 123. Thus, the memory controller 122 may activate the data cache 123 and deactivate the data memory 124 in the EX stage of instruction 2 in clock cycle 5. Meanwhile, the memory controller 122 and/or the processing core 110 may determine that the memory information for the next instruction refers to the data cache 123.

In clock cycle 6, the WB stage of instruction 2 is performed. The memory controller 122 may update the data stored in register 240 into the register file 125. Although there are three instructions in the embodiment, the register in the register file 125 may hold the updated content information until the next instruction (e.g., instruction 3) is executed, so that the memory controller 122 may determine whether to activate the data cache 123 and/or the data memory 124 according to the content information in the associated register of the register file 125 while performing the next instruction.

Table 6 shows another timing diagram of the instruction pipeline in the CPU in accordance with the embodiment of FIG. 2.

In clock cycle 4, the WB stage of instruction 0 and the ID stage of instruction 2 are performed. The memory controller 122 may update the data stored in register 240 into the register file 125. However, the updated data and content information stored in the register file 125 cannot be used by the EX stage of instruction 1 until clock cycle 5. Since backward passing is not allowed in the instruction pipeline, a bubble is inserted into the instruction pipeline of the CPU 105 to delay the EX stage of instruction 1 by one stage. Because no EX stage is performed in clock cycle 4, the memory controller 122 may deactivate both the data cache 123 and data memory 124 in clock cycle 4.

In clock cycle 5, the EX stage of instruction 1 is performed. It should be noted that the data and content information in the register file 125 updated in the WB stage of instruction 0 at clock cycle 4 can be used in the EX stage of instruction 1 in clock cycle 5, and the memory controller 122 may activate the data cache 123 and deactivate the data memory 124 according to the updated content information in the register file 125. Meanwhile, the memory controller 122 and/or the processing core 110 may determine that the memory information for the next instruction (i.e., instruction 2) refers to the data cache 123. Then, the result of the EX stage of instruction 1 and the updated content information for instruction 2 is written into the register 240. Since the WB stage of instruction 1 has not been performed yet to update the register file 125, another bubble is inserted to the instruction pipeline of the CPU 105 to delay the EX stage of instruction 2 by one stage.

In clock cycle 6, the WB stage of instruction 1 is performed. It should be noted that the data and content information in the register file 125 is still invalid for instruction 2 at clock cycle 6, another bubble is inserted into the

TABLE 6

| | Clock Cycle | | | | | | | |
|---|---|---|---|---|---|---|---|---|
| | 1 | 2 | 3 | 4 | 5 | 6 | 7 | 8 |
| Instruction 0 | IF | ID | EX | WB | | | | |
| Instruction 1 | | IF | ID | ○ | EX | WB | | |
| Instruction 2 | | | IF | ID | ○ | ○ | EX | WB |
| Current Memory Info. | — | — | N/A | — | D-Cache | — | D-Cache | D-Memory |
| Distance Info | — | — | — | — | 1 | — | 1 | — |
| Activated Memory | — | — | D-Cache & D-Memory | — | D-Cache | — | D-Cache | — |
| Next Memory Info | — | — | D-Cache | — | D-Cache | — | D-Memory | — |

In another embodiment, the timing of various instructions in the instruction pipeline of the CPU 105 and the content information are shown in Table 6. In addition, the forwarding path 241 is used in the embodiment. For example, the register in the register file 125 is updated with the result of the EX stage of the currently executed instruction and content information for the next instruction in the WB stage. If the register in the register file 125 can be updated prior to the EX stage of the next instruction, the processing core 110 and the memory controller 112 may fetch the updated register in the register file 125 in the EX stage. If the register in the register file 125 cannot be updated prior to the EX stage of the next instruction, a bubble/stalling ○ can be inserted into the instruction pipeline of the CPU 105 so as to delay the EX stage of the next instruction by one stage.

From clock cycle 1 to clock cycle 3, the operations of the instruction pipeline of the CPU 105 in Table 6 are the same as those in Table 5.

instruction pipeline of the CPU 105 to delay the EX stage of instruction 2 by one stage again.

In clock cycle 7, the EX stage of instruction 2 is performed. It should be noted that the data and content information in the register file 125 updated in the WB stage of instruction 1 at clock cycle 6 can be used in the EX stage of instruction 2 in clock cycle 7, and the memory controller 122 may activate the data cache 123 and deactivate the data memory 124 according to the updated content information in the register file 125. Meanwhile, the memory controller 122 and/or the processing core 110 may determine that the memory information for the next instruction (i.e., instruction 3) refers to the data memory 124. Then, the result of the EX stage of instruction 2 is written into the register 240 for future use.

In the aforementioned embodiments, the content information can be stored in the register file 125 or the program counter 210, where the register file 125 or the program counter 210 can be regarded as a memory-activation indicator. When the memory-activation indicator is the program counter 210, the power-saving mechanism can be applied to the instruction-fetch (IF) stage of the CPU 105, such that the memory controller 121 is capable of determining whether to activate the instruction cache 126 and/or the instruction memory 127 according to the content information stored in the program counter 210.

When the memory-activation indicator is the register file 125, the power-saving mechanism can be applied to the execution (EX) stage of the CPU 105. For example, in one scenario, the data cache 123 and data memory 124 are used in the EX stage. In another scenario, the internal memory and the external memory are used in the EX stage.

Figure 4:
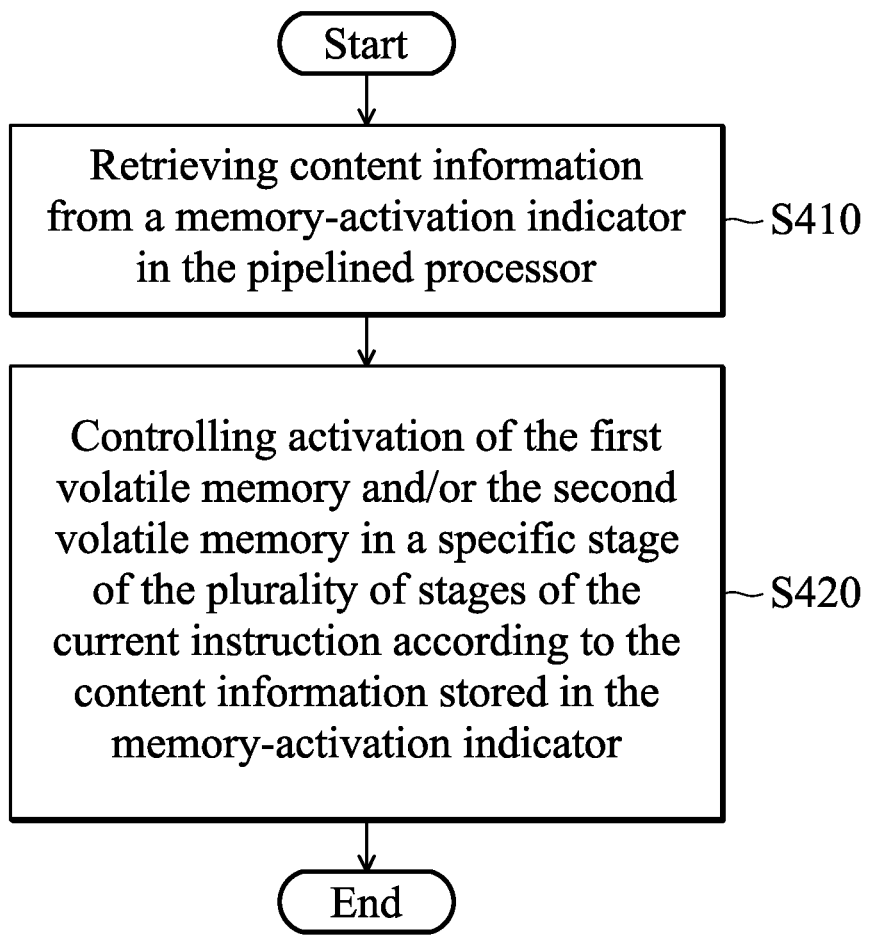
FIG. 4 is a flow chart of a power-saving method for use in a pipelined processor in accordance with an embodiment of the disclosure.

FIG. 4 is a flow chart of a power-saving method for use in a pipelined processor in accordance with an embodiment of the disclosure.

Step S410: retrieving content information from a memory-activation indicator in the pipelined processor, wherein the content information indicates whether to activate and deactivate the first volatile memory and/or the second volatile memory while performing a current instruction. For example, the memory-activation indicator may be the register file 125 or the program counter 210. As described above, different types of the memory-activation indicator can be used in different configurations of the memory sub-system in different stages of the CPU 105.

Step S420: controlling activation of the first volatile memory and/or the second volatile memory in a specific stage of the plurality of stages of the current instruction according to the content information stored in the memory-activation indicator. For example, the content information for the current instruction can be calculated in the IF stage or EX stage of the previous instruction, thereby helping determine whether the first volatile memory and/or the second volatile memory should be activated in the IF stage or the EX stage. If either the first volatile memory or the second volatile memory is activated in the IF stage or the EX stage of the current instruction according to the content information, the power consumption of the semiconductor device 100 can be reduced.

In view of the above, a pipelined processor and a power-saving method for use in a memory sub-system in the pipelined processor are provided. The pipelined processor and the power-saving method are capable of activating the required cache or memory and deactivating the cache or memory that is not required in different stages such as the IF stage or EX stage in the instruction pipeline of the pipelined processor using the content information stored in the memory-activation indicator such as a register file or a program counter. Accordingly, redundant memory activation can be avoided, thereby reducing power consumption of the semiconductor device 100.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pipelined processor for carrying out pipeline processing of instructions which undergo a plurality of stages, comprising:
   a memory-activation indicator comprising a program counter, storing content information that indicates whether to activate one or a combination of a first volatile memory and/or or a second volatile memory while performing a current instruction; and
   a memory controller, arranged for controlling activation of one or a combination of the first volatile memory or the second volatile memory in a specific stage of the plurality of stages of the current instruction according to the content information stored in the memory-activation indicator, wherein, in response to the program counter value stored in the program counter not being equal to a program address indicated by the current instruction, the memory controller determines that the content information stored in the program counter is invalid, and activates both the first volatile memory and the second volatile memory in the specific stage of the current instruction.

2. The pipelined processor as claimed in claim 1, wherein the memory-activation indicator is the program counter, and the specific stage is an instruction-fetch stage, and the first volatile memory and the second volatile memory are respectively an instruction cache and an instruction memory in the pipelined processor that store a plurality of instructions.

3. The pipelined processor as claimed in claim 1, wherein the memory controller further controls activation and deactivation of one or a combination of the first volatile memory or the second volatile memory in the specific stage of the current instruction according to the content information and a program counter value stored in the program counter.

4. The pipelined processor as claimed in claim 3, wherein:
   in response to the program counter value stored in the program counter being equal to a program address indicated by the current instruction, the memory controller determines that the content information stored in the program counter is valid, and activates one or a combination of the first volatile memory or the second volatile memory in the specific stage of the current instruction according to the content information stored in the program counter.

5. A pipelined processor for carrying out pipeline processing of instructions which undergo a plurality of stages, comprising:
   a memory-activation indicator comprising a program counter, storing content information that indicates whether to activate one or a combination of a first volatile memory and/or or a second volatile memory while performing a current instruction; and
   a memory controller, arranged for controlling activation of one or a combination of the first volatile memory or the second volatile memory in a specific stage of the plurality of stages of the current instruction according to the content information stored in the memory-activation indicator, wherein the memory-activation indicator is provided in the register file in the pipelined processor, and the specific stage is an execution stage, and the first volatile memory and the second volatile memory are respectively a data cache and a data memory in the pipelined processor that store data.

6. The pipelined processor as claimed in claim 5, wherein the first volatile memory has a first range in logical addresses, and the second volatile memory has a second range in logical addresses,
    wherein the first range is followed by the second range, and the first range and the second range are consecutive.

7. The pipelined processor as claimed in claim 6, wherein the content information comprises memory information and distance information, and the memory information indicates whether to activate one or a combination of the first volatile memory or the second volatile memory in the execution stage, and the distance information indicates whether a distance from an address of the next instruction to a boundary of the first volatile memory is longer than a predetermined length.

8. The pipelined processor as claimed in claim 7, wherein in response to the distance information indicating that the address of the next instruction to a boundary of the first volatile memory is longer than a predetermined length, the memory controller activates either the first volatile memory or the second volatile memory and deactivates the other of the first volatile memory and the second volatile memory in the execution stage of the current instruction.

9. The pipelined processor as claimed in claim 8, wherein in response to the distance information indicating that the address of the next instruction to the boundary of the first volatile memory is equal to or shorter than a predetermined length, the memory controller activates both the first volatile memory and the second volatile memory in the execution stage of the current instruction.

10. The pipelined processor as claimed in claim 5, wherein the memory controller further updates a stage register with results of the execution stage of the current instruction and the content information for a next instruction,
    wherein the memory controller updates the register file with a value stored in the stage register in a write-back stage of the current instruction,
    wherein the memory controller retrieves the content information stored in the register file to determine whether to activate one or a combination of the first volatile memory or the second volatile memory in the execution stage of the next instruction.

11. The pipelined processor as claimed in claim 5, wherein the memory controller further updates a stage register with results of the execution stage of the current instruction and the content information for a next instruction,
    wherein the memory controller retrieves the content information stored in the stage register to determine whether to activate one or a combination of the first volatile memory or the second volatile memory in the execution stage of the next instruction.

12. The pipelined processor as claimed in claim 1, wherein the memory-activation indicator is the register file in the pipelined processor, and the specific stage is an execution stage, and the first volatile memory and the second volatile memory are respectively an internal memory and an external memory of the pipelined processor.

13. A power-saving method for use in a memory sub-system in a pipelined processor including a plurality of stages, wherein the memory sub-system comprises a first volatile memory and a second volatile memory, the method comprising:
    retrieving content information from a memory-activation indicator, comprising a program counter or register file, in the pipelined processor, wherein the content information indicates whether to activate one or a combination of the first volatile memory or the second volatile memory while performing a current instruction; and
    controlling activation of one or a combination of the first volatile memory or the second volatile memory in a specific stage of the plurality of stages of the current instruction according to the content information stored in the memory-activation indicator, wherein, in response to the program counter value stored in the program counter not being equal to a program address indicated by the current instruction, determining that the content information stored in the program counter is invalid, and activating both the first volatile memory and the second volatile memory in the specific stage of the current instruction.

14. The power-saving method as claimed in claim 13, wherein the memory-activation indicator is the program counter, and the specific stage is an instruction-fetch stage, and the first volatile memory and the second volatile memory are respectively an instruction cache and an instruction memory in the pipelined processor that store a plurality of instructions.

15. The power-saving method as claimed in claim 14, further comprising:
    controlling activation and deactivation of one or a combination of the first volatile memory or the second volatile memory in the specific stage of the current instruction according to the content information and a program counter value stored in the program counter.

16. The power-saving method as claimed in claim 15, further comprising:
    in response to the program counter value stored in the program counter being equal to a program address indicated by the current instruction, determining that the content information stored in the program counter is valid, and activating one or a combination of the first volatile memory or the second volatile memory in the specific stage of the current instruction according to the content information stored in the program counter.

17. A power-saving method for use in a memory sub-system in a pipelined processor including a plurality of stages, wherein the memory sub-system comprises a first volatile memory and a second volatile memory, the method comprising:
    retrieving content information from a memory-activation indicator, comprising a program counter or register file, in the pipelined processor, wherein the content information indicates whether to activate one or a combination of the first volatile memory or the second volatile memory while performing a current instruction; and
    controlling activation of one or a combination of the first volatile memory or the second volatile memory in a specific stage of the plurality of stages of the current instruction according to the content information stored in the memory-activation indicator, wherein the memory-activation indicator is the register file in the pipelined processor, and the specific stage is an execution stage, and the first volatile memory and the second volatile memory are respectively a data cache and a data memory in the pipelined processor that store data.

18. The power-saving method as claimed in claim 17, wherein the first volatile memory has a first range in logical addresses, and the second volatile memory has a second range in logical addresses, wherein the first range is followed by the second range, and the first range and the second range are consecutive.

19. The power-saving method as claimed in claim 18, wherein the content information comprises memory information and distance information, and the memory information indicates whether to activate one or a combination of the first volatile memory or the second volatile memory in the execution stage, and the distance information indicates whether a distance from an address of the next instruction to a boundary of the first volatile memory is longer than a predetermined length.

20. The power-saving method as claimed in claim 19, further comprising:
   in response to the distance information indicating that the address of the next instruction to a boundary of the first volatile memory is longer than a predetermined length, activating either the first volatile memory or the second volatile memory and deactivating the other of the first volatile memory and the second volatile memory in the execution stage of the current instruction.

21. The power-saving method as claimed in claim 20, further comprising:
   in response to the distance information indicating that the address of the next instruction to the boundary of the first volatile memory is equal to or shorter than a predetermined length, activating both the first volatile memory and the second volatile memory in the execution stage of the current instruction.

22. The power-saving method as claimed in claim 17, further comprising:
   updating a stage register with results of the execution stage of the current instruction and the content information for a next instruction;
   updating the register file with a value stored in the stage register in a write-back stage of the current instruction; and
   retrieving the content information stored in the register file to determine whether to activate the first volatile memory and/or the second volatile memory in the execution stage of the next instruction.

23. The power-saving method as claimed in claim 17, further comprising:
   updating a stage register with results of the execution stage of the current instruction and the content information for a next instruction; and
   retrieving the content information stored in the stage register to determine whether to activate one or a combination of the first volatile memory or the second volatile memory in the execution stage of the next instruction.

24. The power-saving method as claimed in claim 13, wherein the memory-activation indicator is the register file in the pipelined processor, and the specific stage is an execution stage, and the first volatile memory and the second volatile memory are respectively an internal memory and an external memory of the pipelined processor.

* * * * *